Patented June 1, 1926.

1,586,543

UNITED STATES PATENT OFFICE.

SIGURD WESTBERG, OF GERMANTOWN, PENNSYLVANIA.

PROCESS OF REFINING METALS.

No Drawing.  Application filed October 21, 1924.  Serial No. 745,012.

My invention relates to refining metals and more particularly to methods of removing impurities therefrom while the metal is in the solid condition.

It is among the objects of my invention to provide a process of removing such impurities as carbon, sulphur, phosphorus and oxygen from solid metals. The impurities with which this application is concerned are those which exist in the metals either as isolated bodies or as constituents of intercrystalline compounds. This process is described in my patent application, Serial No. 30,492, filed in Norway, April 14, 1924.

Heretofore, processes have been described for removing certain impurities from metals and alloys while the metals were yet in the solid condition, by heating them in an atmosphere containing gases other than atmospheric air. Metals have been heated in an atmosphere of hydrogen as described in the literature for improving the magnetic properties of silicon steel by removing oxygen therefrom.

It was discovered by T. D. Yensen that the removal of carbon and sulphur from silicon steel effected a remarkable improvement in the magnetic properties of steel. In his U. S. Patent No. 1,358,810, he describes a process of removing the carbon therefrom. The carbon is removed by heating the metal under oxidizing conditions. The latter process improves the magnetic properties of the steel by removing the carbon directly, or in other words, by a direct oxidation of the carbon.

My invention is an advance over the previous reduction or oxidation processes and contemplates positively removing the sulphur and the carbon more completely and more quickly than by means of the former processes, by means of maintaining the maximum or optimum vapor tension for the impurity that is being removed from the metal, while treating with hydrogen or a gas containing hydrogen.

In one modification of my invention, I accomplish the desired result by employing an alkaline earth oxide compound that will immediately combine with the impurity that is being eliminated, the hydrogen acting somewhat as a carrier of the impurity.

In another modification of my invention, I utilize materials that act in the same manner toward the impurities but one of the materials regenerates hydrogen and thereby effects an economy in the process.

In practicing my invention, rods, sheets, or bars of the metal to be purified are embedded in or coated with lime or an oxide of the alkaline earth metals in an appropriate container or, if preferred, in the heating chamber of a muffle or electric furnace. When treating sheets, it is convenient to dispose the sheets in a stack, placing lime between adjacent sheets but providing sufficient space for the access of gas to the surfaces of the sheets. Hydrogen gas or gas containing hydrogen is then passed into the chamber and the oxidizing atmosphere is removed. The material is then heated to a temperature sufficient to cause a combination of hydrogen and the impurities in the metal. I have found 800° C. to be the approximate minimum temperature and 1400° C. to be the approximate maximum temperature for successful treatment of the metal.

At temperatures lower than 800° C. the reaction is slow, and temperatures higher than 1400° C. are difficult to attain in furnaces of present construction. However, it is possible to utilize a greater range of temperatures below the melting point of iron.

The gas in the heating chamber or muffle may be maintained at any convenient pressure, either at atmospheric pressure, at a pressure lower than atmospheric or at a pressure higher than atmospheric. When the pressure and concentration of the reducing gas is varied, the velocity of reaction is correspondingly varied. However, when the pressure is decreased, the amount of residual hydrogen absorbed in the iron is decreased. Consequently, I may vary my process by decreasing or inceasing the pressure of the gas at different stages of the treatment.

Instead of utilizing an oxide of an alkaline earth metal, I may vary my process by utilizing a compound that will recombine with the impurity being carried away from the metal, such as a hydrogen compound and, at the same time, set free and regenerate hydrogen. For this purpose, I may use silicon or a silicide of iron, aluminum, calcium, magnesium, barium, strontium or I may use carbon. At the temperature of the furnace, the water, hydrogen sulphide, phosphine or like compound reacts with the silicide, forming an oxide, sulphide, phosphide or corresponding compound of aluminum or of the alkaline earth metal, as the case may be; and sets free hydrogen. When embedding the metal in one of the latter compounds or in mixtures containing oxides of the alkaline earth metal therewith, I am able to maintain a high concentration of hydrogen in the furnace without continually adding a large amount of the reducing gas. When this material is employed in close proximity to the metal, a high degree of potential activity between the hydrogen and the impurity in the metal is maintained.

My process comprises heating metals or alloys in an atmosphere containing hydrogen in the presence of an oxide or silicide of an alkaline earth metal or in the presence of the silicide of other metals capable of forming a fixed sulphide, phosphide or oxide at temperatures below the melting point of iron and depends upon extreme reducing conditions.

The impurities, such as oxygen, carbon or sulphur, combine with the hydrogen, thereby removing these impurities from the metal as gaseous compounds. As soon as such a gaseous compound as hydrogen sulphide is liberated, it immediately recombines with another substance, such as an oxide or a silicide of an alkaline earth metal or both. The maximum vapor tension of the hydrogen and the impurity in the metal is thereby maintained and I am able to remove the impurities from the interior of the metal continuously and effectively.

I have described various modifications of my invention but do not wish to be limited thereto, as other modifications thereof will suggest themselves to those skilled in the art. For example, I may combine any of the above-described modifications of my process with the process of annealing. Still other modifications will suggest themselves without departing from the spirit of my invention, the scope of which is defined in the annexed claims.

I claim as my invention:

1. The method of removing impurities from solid ferrous material which comprises heating said material to a welding temperature in a reducing atmosphere in the presence of a compound of an alkaline earth metal.

2. The method of removing impurities from ferrous material which comprises heating said material at normal atmospheric pressure in a reducing atmosphere to a welding temperature and below the melting point of said material.

3. The method of removing impurities from ferrous material which comprises heating said material at normal atmospheric pressure in a reducing atmosphere in the presence of a compound of an alkaline earth metal to a welding temperature and below the melting point of said material.

4. The method of removing impurities from ferrous material which comprises heating said material to a welding temperature in an atmosphere containing hydrogen in the presence of a compound of an alkaline earth metal.

5. The method of removing impurities from solid ferrous material which comprises heating said material to a welding temperature in an atmosphere containing hydrogen in the presence of a compound of an alkaline earth metal.

6. The method of removing carbon, sulphur and oxygen from ferrous material which comprises heating said material to a welding temperature in an atmosphere containing hydrogen in the presence of a compound of an alkaline earth metal.

7. The method of removing impurities from ferrous material which comprises heating said material at normal atmospheric pressure to a temperature below the melting point of said material in an atmosphere containing hydrogen, forming hydrogen compounds with said impurities and continuously removing said hydrogen compounds.

8. The method of removing impurities from ferrous material which comprises heating said material to a welding temperature and below the melting point of said material in an atmosphere containing hydrogen, forming hydrogen compounds with said impurities, continuously removing said hydrogen compounds and regenerating said hydrogen.

9. The method of removing carbon, sulphur and oxygen from ferrous material that comprises heating said material to a welding temperature and below its melting point in a non-oxidizing atmosphere containing hydrogen in the presence of an oxide of an alkaline earth metal, forming a hydrogen compound with said impurity and re-forming an alkaline earth compound with said impurity.

10. The method of removing impurities from metal that comprises heating said metal to a welding temperature and below its melting point in an atmosphere containing hydrogen in the presence of a compound of an alkaline earth metal, forming an alkaline earth compound with said impurity and regenerating said hydrogen.

11. The method of removing impurities from metal that comprises heating said metal to a welding temperature and below its melting point in an atmosphere of hydrogen in the presence of a substance capable of forming a solid stable compound with said impurity at said temperature.

12. The method of removing impurities from metal that comprises heating said metal to a welding temperature and below its melting point in an atmosphere of hydrogen in the presence of a substance capable of forming a stable compound with said impurity and regenerating hydrogen thereby.

13. The method of removing impurities from metal that comprises heating said metal to a welding temperature and below its melting point in an atmosphere of hydrogen in the presence of an oxide of an alkaline earth metal and a silicide of an alkaline earth metal, said alkaline earth oxide and silicide compound being capable of forming a stable compound with said impurity and regenerating hydrogen thereby.

14. The method of purifying metal in the solid state which comprises heating said metal in an atmosphere containing hydrogen in the presence of a solid that maintains the maximum potential activity between the hydrogen and the impurity.

15. The method of purifying metal at a temperature below its melting point which comprises heating said metal in contact with a mixture of silicon and a compound of an alkaline earth metal in an atmosphere containing hydrogen.

16. The method of purifying metal at a temperature below its melting point which comprises heating said metal in contact with a mixture of silicon and lime in an atmosphere containing hydrogen.

In testimony, I have hereunto subscribed my name this 8th day of October 1924.

SIGURD WESTBERG.